(12) United States Patent
Yeung et al.

(10) Patent No.: US 8,406,133 B2
(45) Date of Patent: Mar. 26, 2013

(54) SYSTEM AND METHOD OF REGULATING A PACKET RATE TO OPTIMIZE TRAFFIC IN A NETWORK

(75) Inventors: Wilson Chuen Yew Yeung, Campbell, CA (US); Brian Matsuo, Mountain View, CA (US); Sterling Hughes, San Mateo, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 588 days.

(21) Appl. No.: 12/379,490

(22) Filed: Feb. 24, 2009

(65) Prior Publication Data
US 2010/0214922 A1    Aug. 26, 2010

(51) Int. Cl.
*H04L 12/28*    (2006.01)
(52) U.S. Cl. .......................................... 370/231; 370/412
(58) Field of Classification Search ........................ None
See application file for complete search history.

(56) References Cited

U.S. PATENT DOCUMENTS

| | | | | |
|---|---|---|---|---|
| 6,308,238 | B1 * | 10/2001 | Smith et al. | 710/310 |
| 6,570,847 | B1 * | 5/2003 | Hosein | 370/230.1 |
| 7,099,273 | B2 * | 8/2006 | Ha et al. | 370/229 |
| 7,231,446 | B2 * | 6/2007 | Peiffer et al. | 709/226 |
| 7,406,540 | B2 * | 7/2008 | Acharya et al. | 709/240 |
| 2004/0064577 | A1 | 4/2004 | Dahlin et al. | |
| 2005/0165948 | A1 | 7/2005 | Hatime | |
| 2006/0039287 | A1 * | 2/2006 | Hasegawa et al. | 370/238 |

OTHER PUBLICATIONS

International Search Report and Written Opinion, dated Jun. 4, 2010.
Floyd et al, "Random Early Detection (RED) gateways for Congestion Avoidance", Journal IEEE/ACM Transactions on Networking (TON), vol. 1, Issue 4, Aug. 1993, 22 pps.
Fall et al "Simulation-based Comparisons of Tahoe, Reno and SACK TCP", Newsletter ACM SIGCOMM Computer Communication Review, vol. 26, Issue 3, Jul. 1996, 17 pps.

* cited by examiner

*Primary Examiner* — Kwang B Yao
*Assistant Examiner* — Alex Skripnikov
(74) *Attorney, Agent, or Firm* — Buchanan Ingersoll & Rooney PC

(57) ABSTRACT

Systems and methods of optimizing packet flow in a network are disclosed. An internetwork includes plural networks, each network having plural non-router nodes and at least one router node. The non-router nodes of a first network can be configured to perform congestion control. The non-router node establishes a packet rate value for a packet queue associated with a second network of the internetwork. A total number of packets not greater than the packet rate value are removed from the packet queue. The removed packets are sent to a node in the second network.

17 Claims, 9 Drawing Sheets

FIG. 2E

| RP:C3 | RP:C2 | RP:C1 |

RATE = 0.7, INTERVAL = 1, PACKET-CNT = 0.7

| RP:C3 | RP:C2 | RP:C1 |

RATE = 0.7, INTERVAL = 2, PACKET-CNT = 1.4

| RP:C3 | RP:C2 |

RATE = 0.7, INTERVAL = 3, PACKET-CNT = 1.1

| RP:C3 |

RATE = 0.7, INTERVAL = 4, PACKET-CNT = 0.8

| RP:C3 |

RATE = 0.7, INTERVAL = 5, PACKET-CNT = 1.5

Empty

QUEUE-B, RATE-B = 3

Empty

QUEUE-C, RATE-C=1

QUEUE-D, RATE--D=2

Empty

SYSTEM AND METHOD OF REGULATING A PACKET RATE TO OPTIMIZE TRAFFIC IN A NETWORK

FIELD

The disclosed systems and methods are generally directed to communication and data interchange between nodes in a computer network or internetwork, particularly Internet Protocol based networks and internetworks. The exemplary embodiments are particularly aimed at the efficient and economical transmission of data between computer nodes.

BACKGROUND

An internetwork is a collection of distinct computer networks connected using a common routing technology. The "Internet" is an example of such an internetwork, where communication between nodes in distinct networks is facilitated by an internetworking protocol standard, the Internet Protocol (IP) Suite.

The proper noun "Internet" (capitalized) refers to a global, publicly accessible system of interconnected packet switched networks that interchange data using the Internet Protocol Suite.

Internetworks which are not the "Internet" but which use the Internet Protocol Suite are sometimes referred to variously as an "internet", "IP internetwork", "private internet", "private IP internetwork" or "private IP network". That is to say, that the "Internet" is merely one example of an IP based internetwork, although it is a very popular one owing to its global and publicly accessible nature.

As is generally known in IP networks, in order for a node in an IP internetwork to send data to another node on the IP internetwork, the data must be encapsulated within an IP packet.

FIG. 1A is a block diagram of a computer network consistent with the prior art. As shown in FIG. 1A, Node 1, Node 2, Node 3 and Node 4 are all connected to a computer network 10. For data interchange to occur between networks, an internetwork must be formed. The formation of an internetwork depends on the use of certain nodes, which are distinguished as "routers."

FIG. 1B is a block diagram of an internetwork consistent with the prior art. As shown in FIG. 1B, the internetwork 20 includes a Network A, a Network B, a Network C, and a Network D. Each of these networks includes a special node that is distinguished by a circle. The special nodes Node A, Node B, Node C, and Node D, are routers, and will hereafter be designated Router A, Router B, Router C, and Router D, respectively.

In one example, if Node C3 of Network C sends a packet to Node A1 of Network A, the packet must first be sent to Router C of Network C. Router C in turn, sends the packet to Router B of Network B. From Router B, the packet is sent to Router A of Network Router A, which delivers the packet to Node A1 of Network A. The nomenclature for how a packet is routed from one node to another between networks is often referred to as the "path" between nodes. A path is an ordered list of routers, and each element of a path is variously referred to as an "intermediary node," an "intermediate node," or more simply a "hop."

For example, the path from Node C3 to Node A1 can be designated by P=(C, B, A), where routers C, B, and A are all hops or intermediary nodes in the ordered list P.

Paths between nodes and routers can be formed dynamically or statically. Communication protocols, such as, Routing Information Protocol (RIP), Border Gateway Protocol (BGP), and Open Shortest Path First (OSPF) are examples of dynamic internetworking protocols that are used in IP internetworks.

Congestion control can be described notionally as controlling the rate of entry traffic of packets into a given network with the goal of maximizing ideal throughput between communicating nodes while avoiding congestive collapse. Congestive collapse is a condition where there is little or no useful communication happening because of congestion.

In a packet switched internetwork such as an IP internetwork, there are two popular methods by which congestion control can be achieved:

1. Routers Discard Packets. Routers in an internetwork perform congestion control by discarding packets sent by nodes that would otherwise cause the maximum packet or data rate between two routers to be exceeded. Such an example is found in the method described in the paper "Random Early Detection (RED) Gateways for Congestion Avoidance" by Sally Floyd and Van Jacobson.

2. Non-Router Nodes Perform End-To-End Congestion Control. A node may use congestion avoidance algorithms like Transmission Control Protocol (TCP) congestion avoidance, which performs congestion control between two non-router nodes in an IP internetwork. TCP congestion avoidance has multiple variations, including the variations TCP Reno, TCP Tahoe, and TCP Vegas. The paper "Simulation-based Comparisons of Tahoe, Reno and SACK TCP" by Kevin Fall and Sally Floyd is a useful reference as is the paper "Congestion Avoidance and Control" by Van Jacobson.

Methods that are similar to the "Routers Discard Packets" method described above are not end-to-end congestion control models. "RED Gateway for Congestion Avoidance" by Sally Floyd and Van Jacobson describes a method by which routers and the intermediate hops of a path discard packets to enforce maximum link capacity.

Methods that are similar to TCP congestion avoidance, while end-to-end, do not consider the intermediate hops (routers) of an internetwork path as congestion points. In the TCP congestion avoidance technique, decisions on whether to send a packet are based on the communication success rate of an end-point in isolation.

SUMMARY

The exemplary embodiments described herein optimize packet traffic between two endpoints on a network by considering the amortized success and failure rate of an intermediate node. This method of congestion control differs from other methods of congestion control and provides for end-to-end congestion control that uses the maximum capacity of a router of a network as the primary consideration when deciding whether a packet is to be sent.

An exemplary method of congestion control in an internetwork having plural networks is disclosed. The method comprises establishing a packet rate value for a packet queue in the first network, the packet queue being associated with a second network of the internetwork; removing a number of packets from the packet queue upon the expiry of a defined interval, the number of packets being no greater than the packet rate value; and sending the removed packets to a node in the second network.

Another exemplary method is directed to congestion control in an internetwork having plural networks. The method comprises establishing a recurring rate interval for a first network in the internetwork; associating a packet rate value for a packet queue of the first network, the packet queue being associated with a second network of the internetwork; and sending a number of packets in the packet queue to the second network when the recurring rate interval has elapsed, wherein the number of packets is not greater than the packet rate value.

An exemplary method is directed to congestion control in an internetwork having plural networks. The method comprising, in nodes of a first network among the plural networks, establishing a plurality of packet queues, packet counters, and packet rate values that are respectively associated with other networks among the plural networks. For request packets that are to be sent from a node in the first network to a node in a given one of the other networks, the method comprises establishing a recurring rate interval for the first network; loading the packet associated with the given network queue with at least one request packet, wherein the at least one request packet is destined for a node in the given network of the internetwork; and sending a number of packets to a second network of the internetwork when a first interval of the recurring rate interval has elapsed, wherein the number of packets is not greater than the packet rate value.

DESCRIPTION OF THE DRAWINGS

In the following, exemplary embodiments of the invention will be described in greater detail with reference to the drawings, wherein:

FIGS. 2C-2E are schematic diagrams illustrating the status of a packet queue in accordance with an exemplary embodiment;

DETAILED DESCRIPTION

Figure 1A:
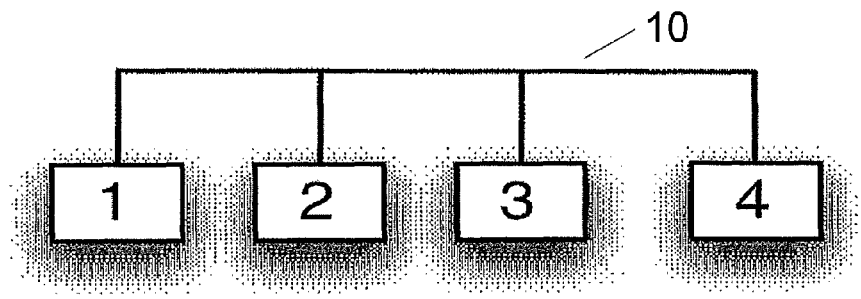
FIG. 1A is a block diagram of a computer network in accordance with the prior art.
Figure 1B:
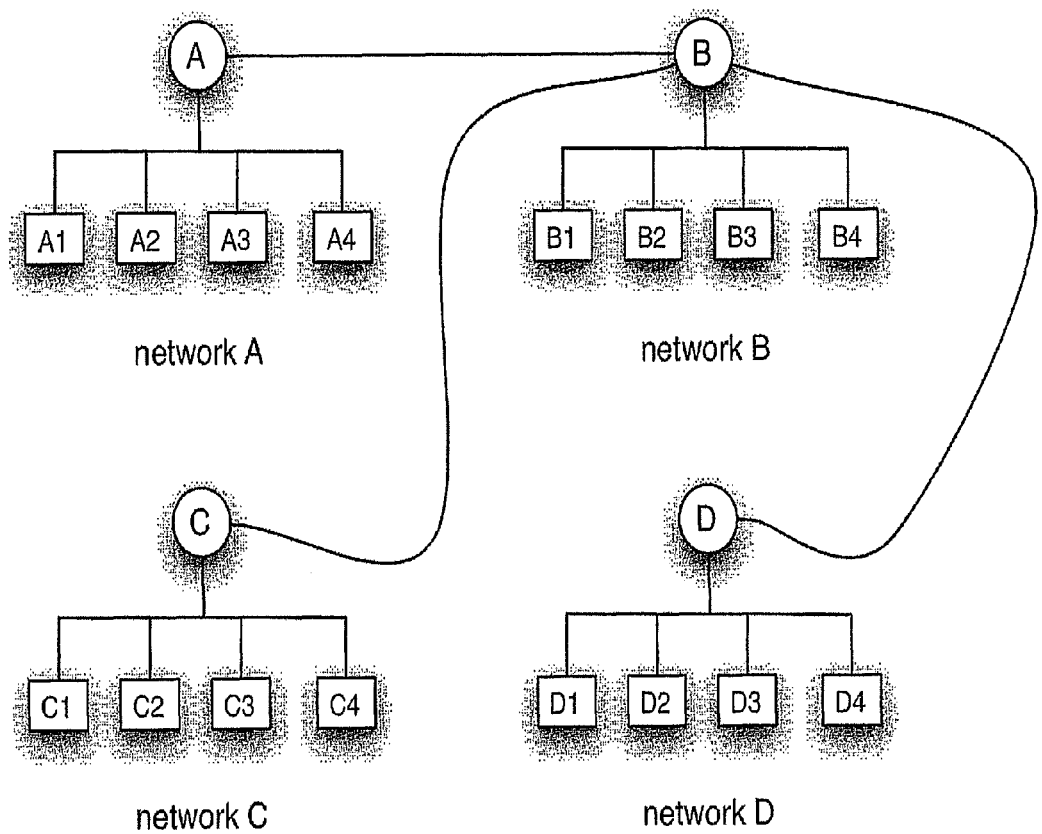
FIG. 1B is a block diagram of an internetwork in accordance with the prior art.
Figure 2A:
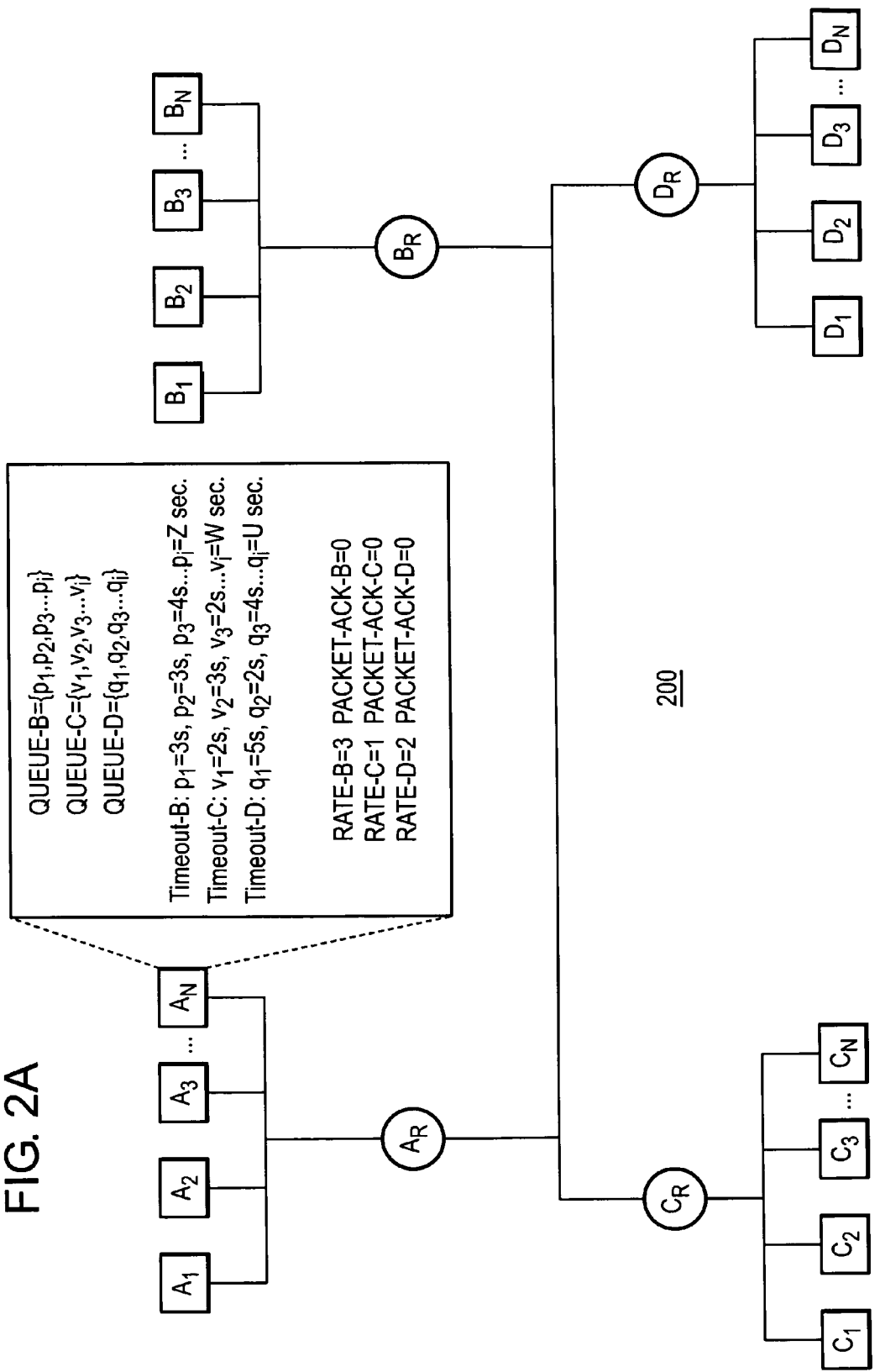
FIG. 2A is a schematic diagram of an internetwork in accordance with an exemplary embodiment.

FIG. 2A is a schematic diagram of an internetwork in accordance with an exemplary embodiment. As shown in FIG. 2A, a packet switched internetwork 200 includes packet switched networks A through D. Each of the packet switched networks includes plural non-router nodes and at least one router node. For example, network A includes plural non-router nodes $A_1$-$A_N$ and a router $A_R$, network B includes plural non-router nodes $B_1$-$B_N$ and a router $B_R$, network C includes plural non-router nodes $C_1$-$C_N$ and a router $C_R$, and network D includes plural non-router nodes $D_1$-$D_N$ and a router $D_R$.

In an exemplary embodiment, a non-router node in an IP internetwork can be configured to send packets to other non-router nodes in the internetwork 200. The node that sends such packets over the internetwork will hereafter be known as the "Sending Node." The nodes that are intended to receive packets over the internetwork will hereafter be known as the "Receiving Nodes." Specifically, the exemplary embodiment addresses an instance in which a Sending Node in a given packet switched network of a packet switched internetwork sends packets to Receiving Nodes of different networks in the same internetwork.

For example, Node A2 (the Sending Node) in Network A may want to send packets to Receiving Nodes Node B1, Node B2, Node B3, and Node B4 on Network B; Node C1, Node C2, Node C3, and Node C4 on Network C; and Node D1, Node D2, Node D3, and Node D4 on Network D.

It is generally true that whenever a Sending Node sends a packet to a Receiving Node, the Sending node expects a packet as acknowledgement in response to the original sent packet within some amount of time after the original packet was sent. The acknowledgement packet may contain only an acknowledgement or may contain response data (which implies acknowledgement). The packet originating from the Sending Node will be referred to as the Request Packet, and the packet sent by the Receiving Node as the Response Packet.

One of ordinary skill will appreciate that for any internetwork, the path between one network to any other network has a maximum (possibly variable) latency and data throughput rate. An exemplary embodiment provides a method for end-to-end congestion control that uses the maximum capacity of a router of a network as the primary consideration when deciding whether a packet is to be sent.

In the following examples of operation of an internetwork, the network in which the Sending Node is located will be generically designated as Network X, and the Network in which a Receiving Node is located will be generically designated as Network Y.

Each node in the Network X executes a network communication process that is responsible for sending packets which are generated by applications running in the node, to other nodes in the internetwork. That process establishes an associated packet queue for each other packet switched network in the internetwork, such as a Network Y (not shown). For example, a QUEUE-Y designates a queue of Request Packets that are to be sent from a node in Network X to Receiving Nodes in the Network Y. An implementation of the packet queue is shown in FIG. 2A. For example, Node $A_N$ in Network A can include a QUEUE-B, a QUEUE-C, and a QUEUE-D. Each of the other nodes in Network A can include the same set of queues. Similarly, although not shown, each node in Network B can include a QUEUE-A, a QUEUE-C, and a QUEUE D; each node in Network C can include a QUEUE-A, a QUEUE B, and a QUEUE D; and each node in Network D can include a QUEUE-A, a QUEUE B, and a QUEUE C.

A timeout value Timeout is associated with each Request Packet that a Sending Node sends to a Receiving Node. One of ordinary skill will appreciate that the value of Timeout for each Request Packet need not be the same, and may in fact be different for every Request Packet sent by the Sending Node. The value Timeout represents the maximum time in seconds (possibly fractional) that the process executing in the Sending Node will wait to receive a Response Packet from the Receiving Node before declaring that either the Request Packet or the Response Packet is lost, indicating a failed transmission.

A maximum allowable packet rate counter can be assigned to each packet queue at one network in the internetwork for sending request packets to other networks in the internetwork 200. For example, with regard to the Network X, a packet rate counter RATE-Y can be associated with QUEUE-Y with respect to Network Y. The counter RATE-Y for the Network Y can be assigned an initial integer value that is greater than 0. The value for each respective RATE can be different for other packet queues in Network X. The RATE value represents the maximum rate that request packets may be sent to a given network. The rate value can be expressed as an integer or fractional value. An exemplary implementation of the packet rate counter during an interval is shown in FIG. 2A. For example, for the Network A, a RATE-B is associated with Network B, a RATE-C is associated with Network C, and a RATE-D is associated with Network D.

The time interval during which request packets can be sent to another network is defined as RATE-INTERVAL. The RATE-INTERVAL is a recurring time interval that repeats until each packet queue is empty. The value RATE-INTERVAL can be expressed in time units, as an integer or fractional number.

By defining a maximum allowable packet rate RATE and a rate interval RATE-INTERVAL, an algorithm for congestion control of an exemplary Network X includes at least the following features:

1. The algorithm is executed every RATE-INTERVAL, e.g., a predefined number of seconds.
2. If the number of packets remaining in QUEUE-Y is less than RATE-Y upon the expiration of an interval, then all of the packets in QUEUE-Y are removed and sent to their respective receiving nodes.
3. If the number of packets remaining in QUEUE-Y is greater than or equal to RATE-Y upon the expiration an interval, then RATE-Y number of packets are removed and sent to their respective receiving nodes for that interval.

Figure 2B:
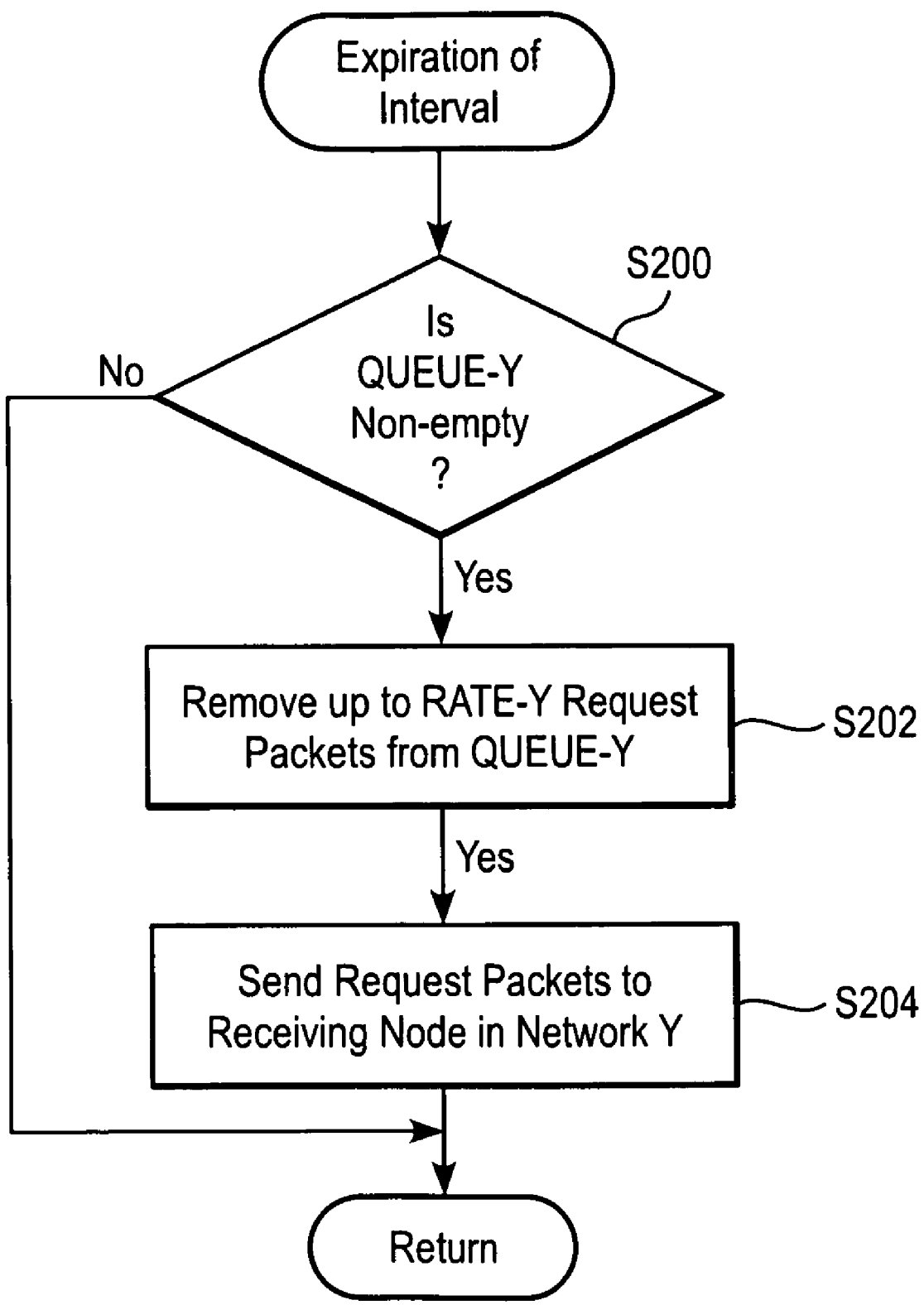
FIG. 2B is a flow diagram of a first congestion control method in accordance with exemplary embodiment.

FIG. 2B is a flow diagram of a first congestion control method in accordance with an exemplary embodiment. As shown in FIG. 2B, at the end of a period of time equal to RATE-INTERVAL, a Sending Node in Network X checks the packet queue QUEUE-Y associated with a receiving node in Network Y to determine whether it is non-empty (S200). If the QUEUE-Y is non-empty, RATE-Y number of packets are removed from QUEUE-Y by the communication process, and transmitted to their respective Receiving Nodes (S202). If the queue is empty, the node returns to other tasks and awaits the expiration of the next interval.

Figure 2C:
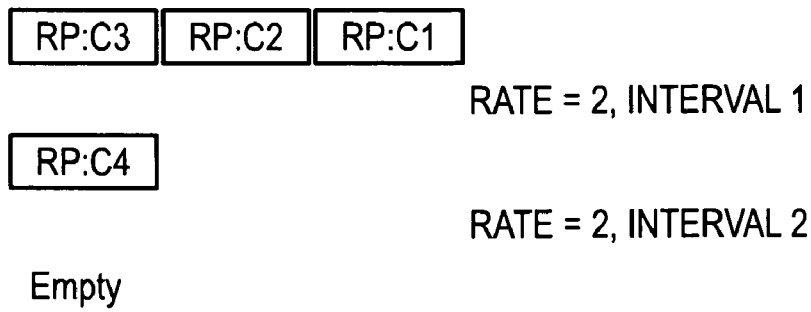
Figure 2D:
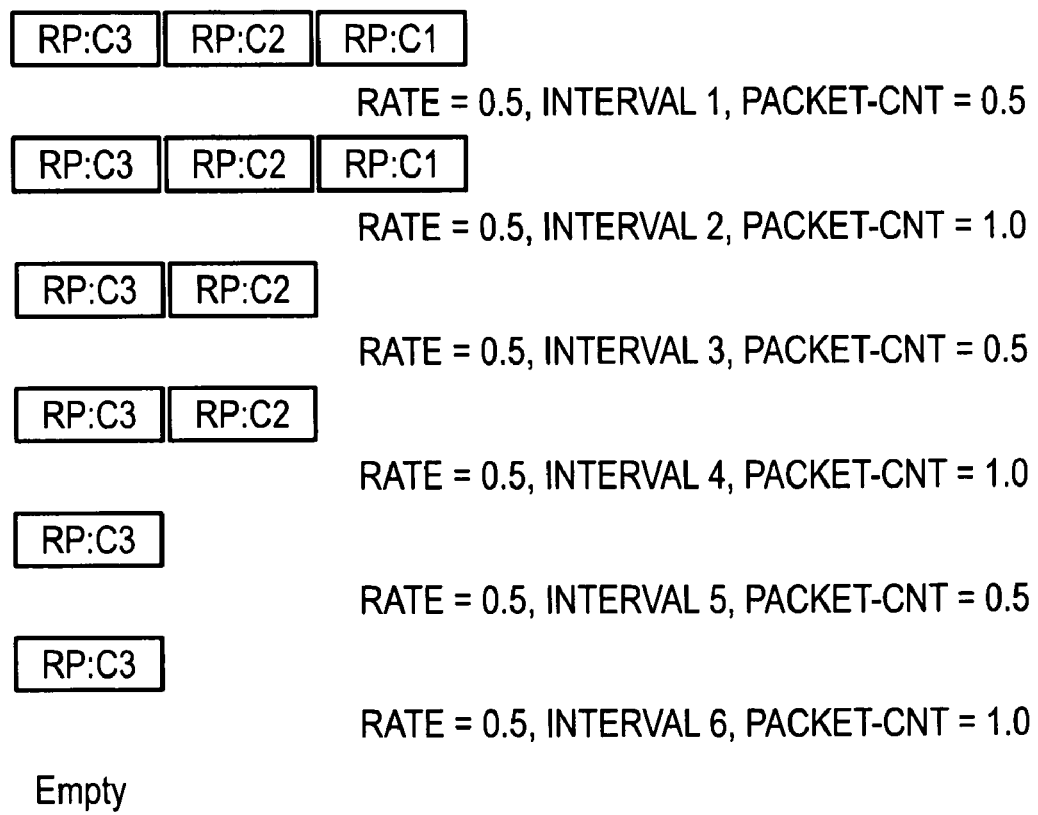

FIGS. 2C-2E are schematic diagrams illustrating the status of a packet queue in accordance with an exemplary embodiment. As shown in FIG. 2C, for an integer value RATE-Y=2, two (2) packets are removed from the QUEUE-Y for transmission at each rate interval. For example, if QUEUE-Y is loaded with 3 packets and a first rate interval elapses, two packets are removed from QUEUE-Y and sent to their destination Receiving Node(s) in Network Y. Thus, after the first rate interval, QUEUE-Y has one packet remaining. After a second rate interval elapses, the one remaining packet in QUEUE-Y is removed and sent to a Receiving Node in Network Y. As shown in this example, if less than two packets remain in the QUEUE-Y, then all packets are removed from the QUEUE-Y when the interval elapses.

In FIG. 2D, the packet rate is a fractional value RATE-Y=0.5. For instance, the desired rate of transmission may be one packet every two (2) seconds. If the rate interval is set at one (1) second, the resulting packet rate is effectively RATE-Y=0.5.

In theory, at a packet rate of 0.5 packet/sec, one-half (½) of a packet is removed from QUEUE-Y. However, in practice, because packets are transmitted as integral units, only whole packets are removed from a queue. Consequently, a packet is not removed from QUEUE-Y until the next time interval. To accomplish this result, a packet counter PKT-CNT-Y for Network Y is incremented by RATE-Y as each rate interval elapses. However, packets are not removed from QUEUE-Y unless the counter is equal to or greater than an integer value (e.g., 1). At that point, the number of packets corresponding to the integer value are removed from QUEUE-Y, and the packet counter PKT-CNT-Y is decremented by the number of packets that have been removed. In the foregoing example, where RATE-Y=0.5, after the first rate interval elapses, the value of PKT-CNT-Y=0.5 and no packet is removed from the queue. After the second interval elapses, the counter PKT-CNT-Y=1.0, causing one packet to be removed from QUEUE-Y for transmission. The counter PKT-CNT-Y is then decremented by one for the next interval.

In another example shown in FIG. 2E, the packet rate is a fractional value RATE-Y=0.7. After a first rate interval, the packet counter is incremented by 0.7 such that PKT-CNT-Y=0.7 and no packets are removed from QUEUE-Y. After a second rate interval, the packet rate counter is incremented by 0.7 so that PKT-CNT-Y=1.4. After the second interval, one packet is removed from QUEUE-Y and the packet counter is decremented by one (1) so that PKT-CNT-Y=0.4. After a third rate interval, the packet rate counter is incremented by 0.7 so that PKT-CNT-Y=1.1. After the third rate interval one packet is removed from the QUEUE-Y and the packet rate counter is decremented by one so that PKT-CNT-Y=0.1. This process is repeated until all packets are removed from the QUEUE-Y. Each packet that is removed from QUEUE-Y in Network X is sent to a Receiving Node in Network Y (S204). Once the queue is empty, any residual value remaining in the packet counter can be reset to zero.

The foregoing embodiments have been discussed with respect to sending Request Packets from a Sending Node in a Network X to Receiving Nodes in a Network Y at a packet rate, RATE, which is static. In an alternative embodiment, the packet rate RATE at a Network X can be dynamically adjusted based on a success or failure in receiving an acknowledgment (i.e., Response Packet) from nodes in Network Y. The packet rate adjustment can be based on success/failure ratio. Conventionally, congestion control parameters are adjusted on a point-to-point basis, e.g. a measurement of packets that are successfully transmitted from a given source to a given destination. In contrast, the dynamic rate adjustment of this embodiment is carried out with respect to multiple destination addresses, e.g. all Receiving Nodes in Network Y, rather than a single target address.

The success/failure ratio can be a percentage value based on the proportion of total number of acknowledged packets to the total number of request packets sent to a network (e.g., Network Y) for a suitable sample. The sample can be based on a number of packets, e.g. the last 100 packets that were sent to Network Y, or on a period time, such as all packets sent to Network Y in the last 10 seconds. In an exemplary embodiment the success failure ratio can be based on an exponential moving average of multiple samples, to give more weight to newer sample data. The success/failure ratio can be compared to a relative threshold to determine whether the packet rate can be increased due to successful transmission at the current RATE or should be decreased due to an excessive number of failures in transmission at the current RATE. For example, if the threshold is set at 90%, the packet rate counter RATE-Y is incremented by a suitable value (integer or fractional) after each interval during which the success failure ratio exceeds 90%, and is decremented by that value when the ratio falls below 90%.

Figure 3:
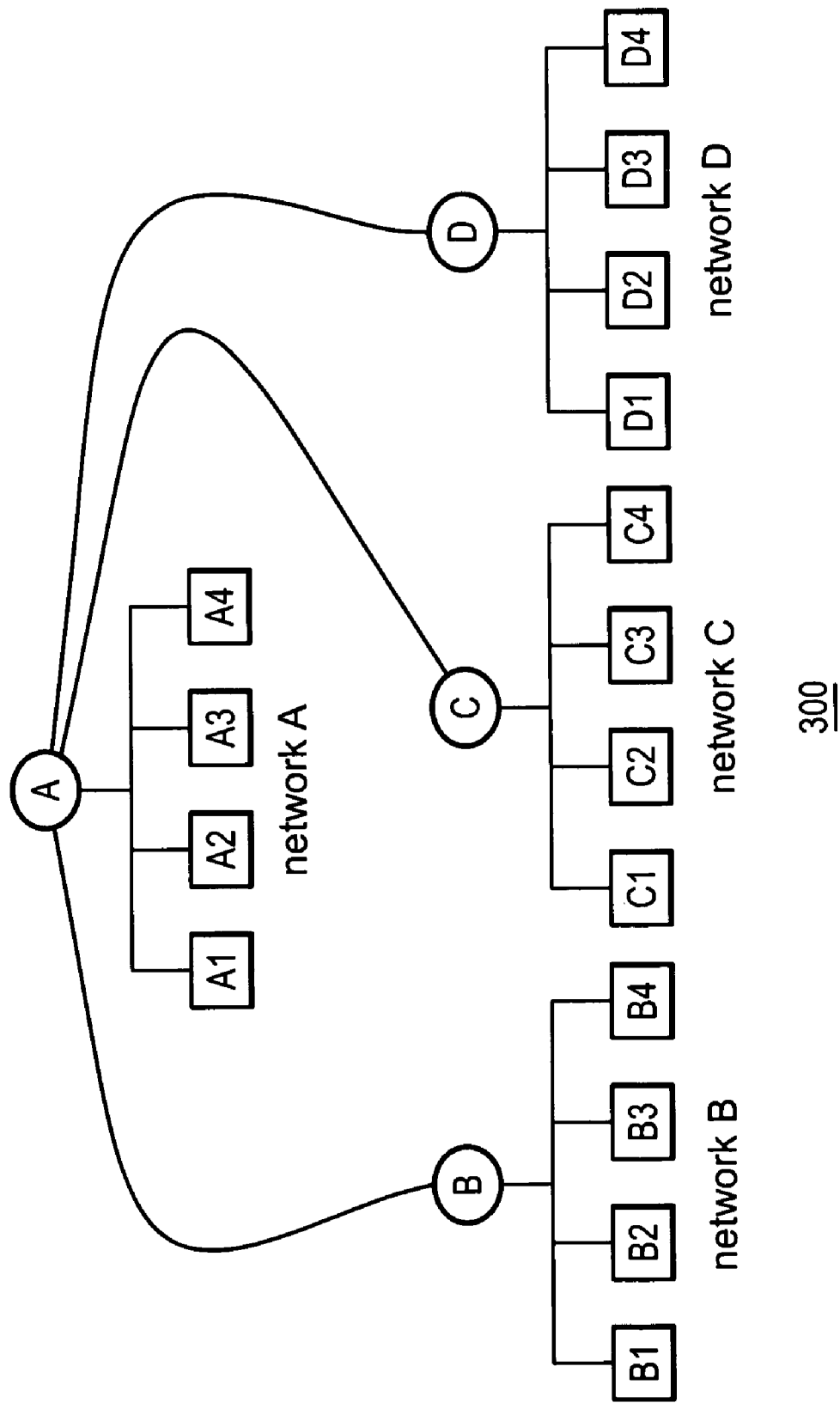
FIG. 3 is a schematic diagram of an internetwork in accordance with an exemplary embodiment.

FIG. 3 is a schematic diagram of an internetwork in accordance with an exemplary embodiment. As shown in FIG. 3, an internetwork 300 includes plural networks designated as network A, network B, network C, and network D. Each network is comprised of plural nodes. The plural nodes and their membership to a respective network can be defined as follows:

Network A includes nodes A1, A2, A3, A4;
Network B includes nodes B1, B2, B3, B4;
Network C includes nodes C1, C2, C3, C4; and
Network D includes nodes D1, D2, D3, D4

One of ordinary skill will appreciate that the internetwork 300 may have any number of networks and each network may have any number of plural nodes as desired. The number of networks and the number of nodes per network can vary by implementation.

In an exemplary implementation based on the internetwork 300, Node A1 can send a Request Packet to each of the nodes B1, B2, B3, B4, C1, C2, C3, C4, D1, D2, D3, D4. In order to distinguish one packet from another packet, the Request Packets destined to each of the nodes can be denoted with the label RP:RECEIVING-NODE. For example, a Request Packet destined for Receiving Node B1 is labeled as RP:B1, and a Request Packet destined for Receiving Node C2 is labeled as RP:C2, and so on.

Each of the Request Packets destined for nodes B1-B4, C1-C4, and D1-D4 can be enumerated as follows:
RP:B1, RP:B2, RP:B3, RP:B4, RP:C1, RP:C2, RP:C3, RP:C4, RP:D1, RP:D2,RP:D3, and RP:D4.

Each Request Packet has an associated expiry time or timeout value T in seconds. The timeout values for the Request Packets need not all be the same, and can be unique for each Request Packet as desired.

The Request Packets are organized based on the destination network to which the Receiving Nodes correspond. That is, for the Network A, a queue can be created for each of the Networks B, C, and D, where a Request Packet is a member of the queue if the node associated with the Request packet is a member of the network associated with the queue. Furthermore, the maximum allowable packet rate (RATE) counter variable can be set to some initial value for each of the queues, the acknowledged packet (PACKET-ACK) counter for each of the queues can be set to 0, and the interval of time (RATE-INTERVAL) for sending packets to receiving nodes can be set to an initial value for the network of the sending nodes.

In the discussion below, the congestion control method as shown in FIG. 2B will be described in the context of an implementation of internetwork 300.

A Node A1 can send Request Packets to any of the nodes B1-B4, C1-C4, and D1-D4, if each network queue QUEUE-B, QUEUE-C, and QUEUE-D, respectively, is non-empty (S200). A RATE-INTERVAL for sending request packets to the receiving nodes is defined, and a packet rate (RATE) is defined for each queue.

Figure 4A:
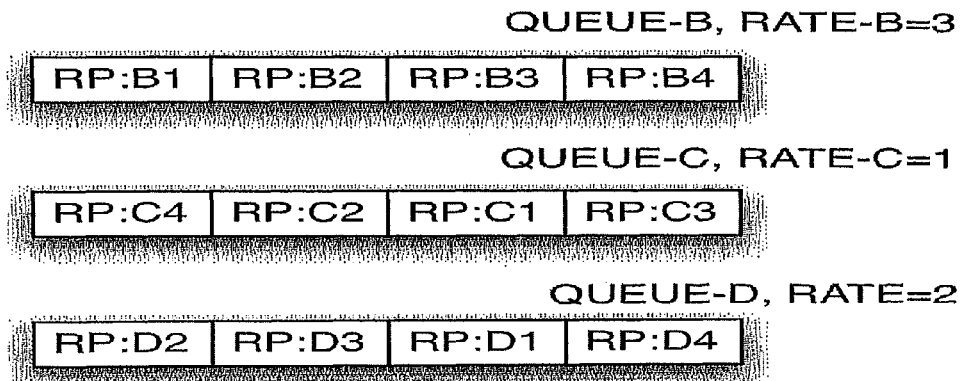
FIGS. 4A-4C are schematic diagrams of each network queue during the congestion control process in accordance with an exemplary embodiment.

FIG. 4A illustrates an exemplary status of each queue following the completion of S200. As shown in FIG. 4A, each queue is loaded with respective Request Packets, and a packet rate for each queue is initialized to RATE-B=3, RATE-C=1, and RATE-D=2.

After the elapse of one RATE-INTERVAL, each queue is examined to determine the number of packets to process based on the respective packet rate for each queue. In this example, three (3) packets are removed from QUEUE-B, one (1) packet is removed from QUEUE-C, and two (2) packets are removed from QUEUE-D and sent to the respective receiving nodes (S202, S204).

Figure 4B:
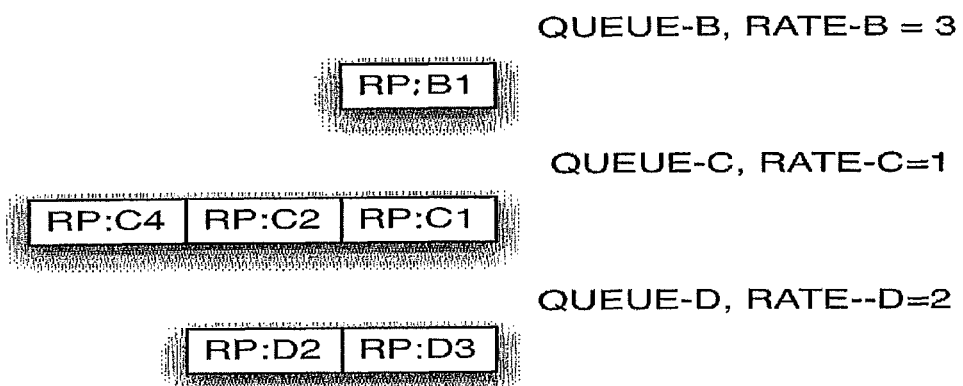

FIG. 4B illustrates an exemplary status of queues QUEUE-B, QUEUE-C, and QUEUE-D of Network A following the completion of step S204 after a first RATE-INTERVAL has elapsed. In comparing FIGS. 4A and 4B, one of ordinary skill will appreciate that packets have been removed from their respective queues, and sent to a designated Receiving Node based on the queue and network to which each respective packet is associated as follows:

Network B, Queue B: RP:B4, RP:B3, RP:B2
Network C, Queue C: RP:C3
Network D, Queue D: RP:D4, RP:D1

After a rate interval number of seconds have elapsed, steps S200-S204 can be repeated until each queue is empty. Whenever the QUEUE associated with a network is non-empty and the rate interval has elapsed, packets in the QUEUE can be removed based on the RATE of the QUEUE. Upon removal from the queue, the packets are sent to the designated Receiving Node.

After another rate interval has elapsed, each queue is once again examined to determine the number of packets to process. Based on the examination, one (1) packet is removed from QUEUE-B, one (1) packet is removed from QUEUE-C, and two (2) packets are removed from QUEUE-D (S202). One of ordinary skill will appreciate that although QUEUE-B has a packet rate RATE-B=3, because only one (1) packet remains in the queue, only one packet can be removed. The packets removed from QUEUE-B, QUEUE-C, and QUEUE-D are sent to the receiving nodes (S204).

Figure 4C:
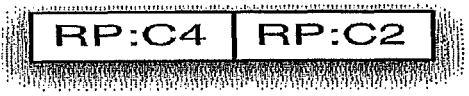

FIG. 4C illustrates an exemplary status of queues QUEUE-B, QUEUE-C, and QUEUE-D following the completion of S204 after the second rate interval. As shown in FIG. 4C, only QUEUE-C has packets remaining after the second rate interval. As a result, steps S200-S204 will be repeated for a third and fourth rate interval at a packet rate RATE-C=1, until QUEUE-C is empty.

One of ordinary skill will appreciate that the set of Request Packets that are to be sent need not be static. For example, if during the life of an application running on the Sending Node, an additional packet is to be sent to another node, the Request Packet can be loaded into the appropriate queue associated with the appropriate network, and transmitted as packets continue to be removed from the queue.

The algorithm shown in FIG. 2B can be executed by a processor at a Sending Node so that the Sending Node can perform congestion control on a per network basis.

Figure 5:
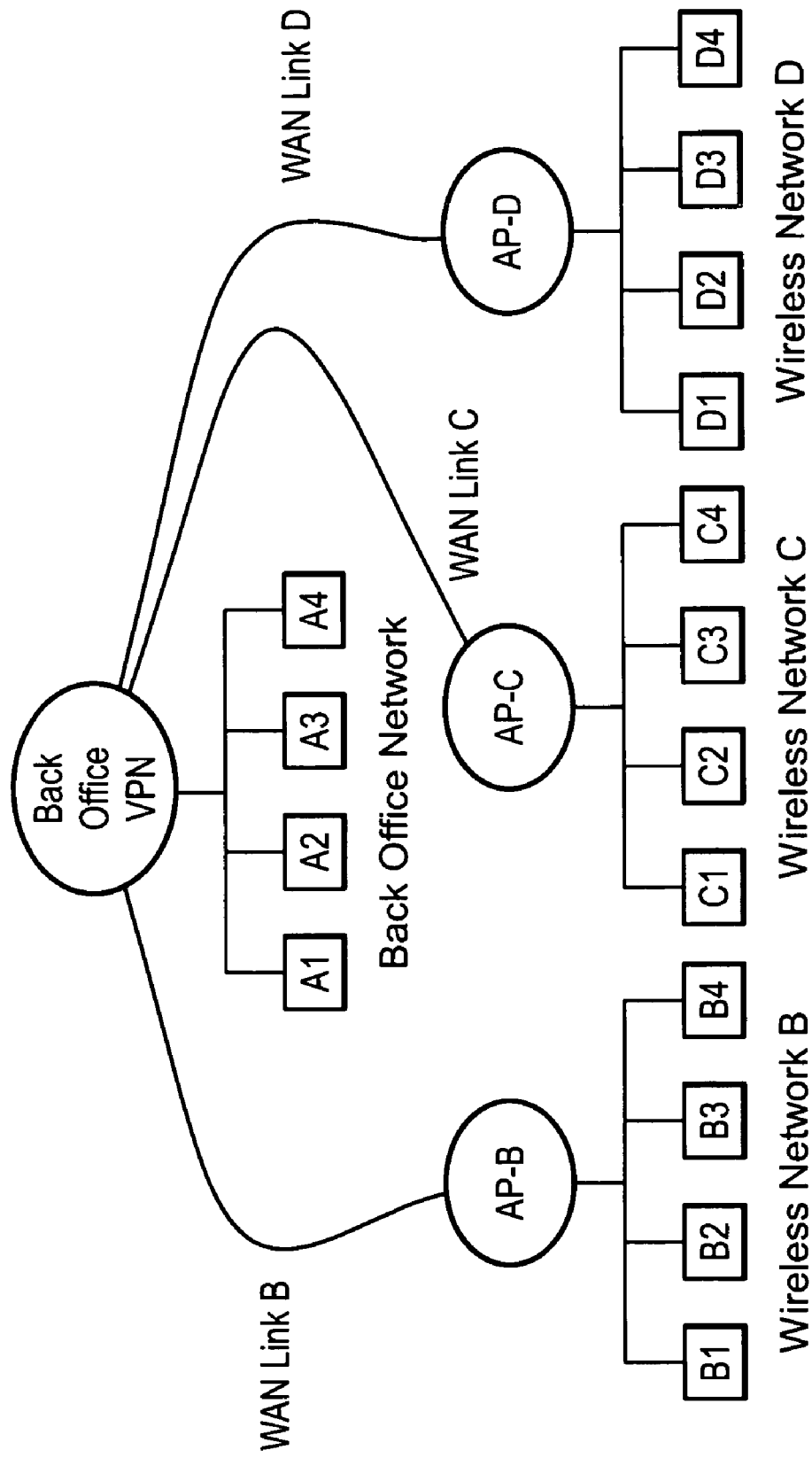
FIG. 5 is a schematic diagram of a utility monitoring and control network in accordance with an exemplary embodiment.

The exemplary embodiments can be implemented in a variety of different types of communication systems. One illustrative example is a utility monitoring and control network. FIG. 5 is a schematic diagram of a utility monitoring and control network in accordance with an exemplary embodiment. The utility monitoring and control network can be configured based on the exemplary internetwork implementation of FIG. 3. The exemplary utility monitoring and control network can have the following node and network definitions:

Network A can be designated as a Utility Back Office Network.
Router A can be designated as a Back Office Virtual Private Network (VPN) concentrator.
Router B, Router C, and Router D can be designated as Wireless Access Points and hereinafter referred to as Access Point B, Access Point C, and Access Point D, or AP-B, AP-C, and AP-D, respectively.
Network B, Network C, and Network D can be designated as Wireless Mesh Networks.
Interlinks between AP-A, AP-B, and AP-C can be Wide Area Network (WAN) Links. The nature of the WAN Link can be one of numerous types, including Ethernet, Code Division Multiple Access (CDMA), General Packet Radio Service (GPRS), Evolution Data Optimized (EVDO), Wideband Code Division Multiple Access (WCDMA), or any other suitable WAN Link as desired.

Each of the Nodes B1-B4, C1-C4, and D1-D4 can be designated as nodes in a wireless mesh network.

Each of the Nodes B1-B4, C1-C4, and D1-D4 can be connected via a serial line to a utility metering device. The utility metering device can be designated as an electric meter, a gas meter, or a water meter of either residential or commercial and industrial variety, or any other suitable metering device as desired.

The processor of each of the Nodes B1-B4, C1-C4, and D1-D4 can be configured through software to send queries and commands to connected utility metering devices and send the results of those queries and commands to other nodes in the internetwork based on the congestion control algorithm illustrated in FIG. 2B.

The exemplary systems and method described above provide several advantages over conventional congestion control and/or avoidance techniques. In particular, the exemplary system and methods for monitoring packets-in-flight in a network as described herein, is an end-to-end congestion control technique that uses the maximum capacity of a router of a network as the primary consideration when deciding whether a packet is to be sent. Moreover, the exemplary system and methods are implemented by non-router sending nodes. Additionally, the above-described system and methods bases a decision to send packets to a network on the capacity of the router of the network in aggregate, rather than the capacity of a single node of the network in isolation.

The systems and methods described herein can be implemented through software code that is encoded, recorded, or stored on a computer readable medium. The computer readable medium can be used in configuring each sending node, which is connected to an internetwork as described above. One of ordinary skill in the art will appreciate that the computer readable medium can include an optical disk, floppy disk, flash memory, magnetic tape, or any tangible storage device or medium as desired.

One of ordinary skill will appreciate that the congestion control system and methods described here can accommodate an arbitrary number of networks and internetworks, an arbitrary number of request packets, and an arbitrary number of nodes in each network.

While the invention has been described with reference to specific embodiments, this description is merely representative of the invention and is not to be construed to limiting the invention. Various modifications and applications may occur to those skilled in the art without departing from the true spirit and scope of the invention as defined by the appending claims.

What is claimed is:

1. A method of controlling packet flow at a first network in an internetwork of plural networks, the method comprising:
   initiating a recurring time interval;
   establishing a plurality of packet queues in the first network, each of said packet queues being associated with a respective other network of the internetwork;
   establishing a respective packet rate value for each of the other networks;
   when the recurring time interval elapses, removing a number of packets from the packet queue associated with a given one of the other networks, the number of packets being no greater than the packet rate value associated with that given one of the other networks;
   sending the removed packets to at least one node in the given one of the other networks;
   detecting packets that are successfully received at a plurality of nodes on the given network;
   calculating a ratio based on a number of detected packets that are successfully received at the plurality of nodes on the given network;
   comparing the ratio to a threshold value; and
   adjusting the packet rate value for the given network, based on the comparison.

2. The method of claim 1, wherein the packet rate value is a fractional value.

3. The method of claim 2, wherein when the packet rate value is a fractional value, the method comprises:
   establishing a packet rate counter for the given network;
   incrementing the packet rate counter by the packet rate value associated with the given network when the time interval elapses;
   removing a packet from the packet queue associated with the given network, when the packet rate counter is equal to or greater than one; and
   decrementing the packet rate counter by one when a packet is removed from the packet queue.

4. The method of claim 1, wherein the recurring time interval is a fractional value.

5. The method of claim 1, wherein when the number of packets in the packet queue is less than the packet rate value, all packets are removed from the packet queue.

6. The method of claim 1, wherein each individual node in the first network executes the steps of claim 1 to control packet flow.

7. A method of congestion control in an internetwork having plural networks, the method comprising:
   establishing a recurring interval for a first network in the internetwork;
   associating a plurality of packet queues in the first network with respective other networks of the internetwork and a packet rate value with each packet queue;
   sending a number of packets in the packet queue associated with a given one of the other networks to one or more nodes of the given network when the recurring interval has elapsed, wherein the number of packets is not greater than the packet rate value for the packet queue of the given network;
   detecting packets that are successfully received at a plurality of nodes in the given network;
   calculating a ratio based on a number of detected packets that are successfully received at the plurality of nodes on the given network;
   comparing the ratio to a threshold value; and
   adjusting the packet rate value for the given network, based on the comparison.

8. The method of claim 7, wherein when the number of packets in the packet queue is less than the packet rate value, all packets in the packet queue are sent to the given network.

9. The method of claim 7, wherein sending the number of packets to the given network comprises:
   removing the number of packets from the packet queue associated with the given network, wherein the number of packets is not greater than the packet rate value for the packet queue of the given network.

10. The method of claim 7, wherein when the packet rate value is a fractional value, sending the number of packets to the given network comprises:
    establishing a packet rate counter for the given network;
    incrementing the packet rate counter by the packet rate value associated with the given network when each rate interval elapses;

removing a packet from the packet queue associated with the given network, when the packet rate counter is equal to or greater than one; and decrementing the packet rate counter by one when a packet is removed from the packet queue.

11. The method of claim 7, further comprising:

removing the number of packets from the packet queue during each recurring rate interval.

12. A method of congestion control in an internetwork having plural networks, with each of the plural networks having plural nodes, the method comprising:

in at least one node of a first network among said plural networks, establishing a plurality of packet queues that are respectively associated with other networks among said plural networks, and establishing a respective packet rate value for each of said other networks;

establishing a recurring interval for the first network; and for request packets that are to be sent from the at least one node in the first network to a node in a given one of said other networks:

loading the packet queue associated with the given network with at least one packet, wherein the at least one packet is destined for a node in the given network of the internetwork;

sending a number of packets from said queue to the given network of the internetwork when a first interval of the recurring interval has elapsed, wherein the number of packets is not greater than the packet rate value associated with the given network;

detecting packets that are successfully received at a plurality of nodes on the given network;

calculating a ratio based on a number of detected packets that are successfully received at the plurality of nodes on the given network;

comparing the ratio to a threshold value; and adjusting the packet rate value associated with the given network, based on the comparison.

13. The method of claim 12, further comprising:

removing the number of packets from the packet queue associated with the given network during each time interval.

14. The method of claim 13, wherein when the packet rate value is a fractional value, sending the number of packets to the given network comprises:

establishing a packet rate counter for the given network;

incrementing the packet rate counter by the packet rate value associated with the given network;

removing a packet from the packet queue associated with the given network, when the packet rate counter is equal to or greater than one; and decrementing the packet rate counter by one when a packet is removed from the packet queue.

15. The method of claim 12, wherein at least one of the packet rate values is a fractional value.

16. The method of claim 12, wherein the recurring interval is a fractional value.

17. The method of claim 12, wherein when the number of packets in the packet queue for the given network is less than the packet rate value for that network, all packets in the packet queue are sent to the given network.

* * * * *